(12) United States Patent
Goebel (10) Patent No.: US 6,519,575 B1
(45) Date of Patent: Feb. 11, 2003

(54) SYSTEM AND METHOD FOR CLASSIFYING UNKNOWN DATA PATTERNS IN MULTI-VARIATE FEATURE SPACE

(75) Inventor: Kai Frank Goebel, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/556,802

(22) Filed: Apr. 24, 2000

(51) Int. Cl.⁷ .............................. G06E 1/00; G06K 9/62
(52) U.S. Cl. .......................................... 706/20; 382/159
(58) Field of Search .............................. 706/20; 382/159

(56) References Cited

U.S. PATENT DOCUMENTS

| | | | |
|---|---|---|---|
| 4,773,099 A | * 9/1988 | Bokser | 382/225 |
| 5,060,277 A | * 10/1991 | Bokser | 382/160 |
| 5,657,397 A | * 8/1997 | Bokser | 382/225 |
| 5,778,095 A | * 7/1998 | Davies | 382/225 |

* cited by examiner

Primary Examiner—George B. Davis
(74) Attorney, Agent, or Firm—David C. Goldman; Noreen C. Johnson (57) ABSTRACT

A system and method for classifying unknown data patterns in a multi-variate feature space. An observer 12 evaluates the closeness of the data to any one of a plurality of known classes in a multi-variate feature space. A classifier 14 classifies the evaluated data into one of the plurality of known classes. A flagger 16 flags data having an unknown classification. A label requester 18 requests that the flagged data be interpreted into either a new class or one of the plurality of known classes. If the interpretation is a new fault, then a new class adder 22 sets up a new cluster representative of the fault and inputs the new class to the classifier 14. Alternatively, if the interpretation is that the flagged data belongs to one of the plurality of known classes, then a class resetter 24 resets the boundaries of this class and informs the classifier 14 of the change.

30 Claims, 13 Drawing Sheets

| x4 | x3 | x2 | x1 | label |
|---|---|---|---|---|
| 0 | 0 | 0 | 0 | normal |
| 0 | 0 | 0 | + | unlabeled_1 |
| 0 | 0 | 0 | - | unlabeled_2 |
| 0 | 0 | + | 0 | unlabeled_3 |
| 0 | 0 | + | + | unlabeled_4 |
| 0 | 0 | + | - | unlabeled_5 |
| 0 | 0 | - | 0 | unlabeled_6 |
| 0 | 0 | - | + | unlabeled_7 |
| 0 | 0 | - | - | unlabeled_8 |
| 0 | + | 0 | 0 | unlabeled_9 |
| ... | ... | ... | ... | |
| + | + | + | + | fault 1 |
| ... | ... | ... | ... | |
| ... | ... | ... | ... | |
| - | - | - | - | unlabeled_108 |

| EGT | WF | N2 | label |
|---|---|---|---|
| 0 | 0 | 0 | normal |
| 0 | 0 | + | unlabeled_2 |
| 0 | 0 | - | unlabeled_3 |
| 0 | + | 0 | unlabeled_4 |
| 0 | + | + | unlabeled_5 |
| 0 | + | - | unlabeled_6 |
| ... | ... | ... | ... |
| + | + | - | C-clip fault |
| ... | ... | ... | ... |
| + | + | + | VBV fault |

FIG. 12

SYSTEM AND METHOD FOR CLASSIFYING UNKNOWN DATA PATTERNS IN MULTI-VARIATE FEATURE SPACE

BACKGROUND OF THE INVENTION

This invention relates generally to data classification and more particularly to classifying unknown data patterns in mult-variate feature space.

Data classification is used for many different applications. For example, it is suitable for use in the remote monitoring of a complex system, where the system under observation and the monitoring equipment and personnel are located at different locations. In this type of remote monitoring application, a sensor suite is typically connected to the system for acquiring operational data and transferring the data to the monitoring equipment and personnel. The data comprise data features, which are raw data that have been cleaned of errors not compatible with further processing in the system or data which have been transformed to extract information from the raw data (e.g., statistical properties, transformations into a different domain, principle component analysis, etc.). The remote monitoring equipment and personnel can use the data features to distinguish an array of possible fault conditions such as tripped performance thresholds, faulty actuators, some material fatigue faults, etc. Generally, the monitoring equipment and personnel use algorithms that employ methods such as threshold detection, classification, case-based reasoning, expert systems, etc., to recognize known faults. For the most part, these algorithms when tuned properly work reasonable in recognizing known faults. However, problems arise when a new condition is encountered that these algorithms have not been trained to recognize. In this type of situation, misclassifications by the algorithms are often unavoidable. Misclassifications can result in an incorrect assessment of the operating conditions, which may lead to a potentially undesirable and even damaging outcome. Therefore, there is a need for a mechanism that can detect previously unknown data patterns and set up classes for these unknown patterns so that when encountered again, the patterns can quickly and accurately be recognized.

SUMMARY OF THE INVENTION

In accordance with this invention, there is provided a system and a method for classifying data obtained from a process in a multi-variate feature space. In this embodiment, an observer evaluates the closeness of the data to any one of a plurality of known classes defined in the multi-variate feature space. A classifier classifies the evaluated data into one of the plurality of known classes. A flagger flags data having an unknown classification. A label requester requests that the flagged data be interpreted into either a new class or one of the plurality of known classes. A classifier adjuster adjusts the classifier according to the interpretation.

In accordance with another embodiment, there is a multi-variate data assessment tool and method for assessing data obtained from a process. In this embodiment, an observer evaluates the closeness of the data to any one of a plurality of known classes defined in a multi-variate feature space for the process. A classifier classifies the evaluated data into one of the plurality of known classes. A flagger flags data having an unknown classification. A label requester requests that the flagged data be interpreted into either a new class or one of the plurality of known classes. A new class adder adds a data cluster representative of a new class into the classifier. A class resetter resets the plurality of known classes in the classifier to accommodate new class boundaries.

DETAILED DESCRIPTION OF THE INVENTION

Figure 1:
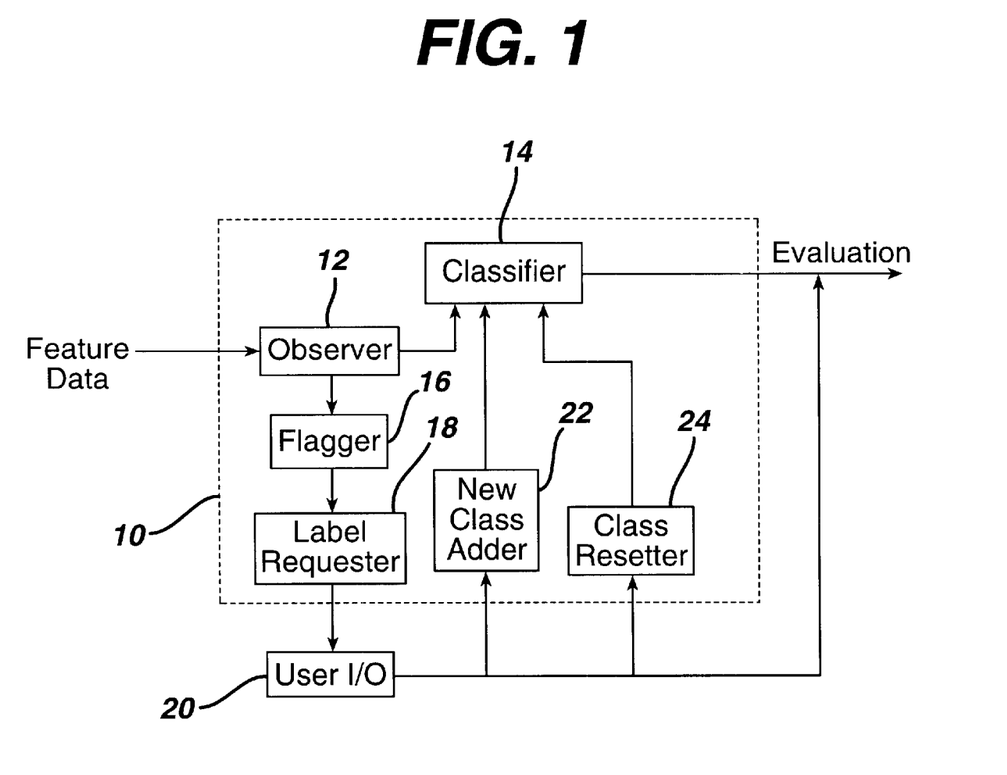
FIG. 1 shows a block diagram of a tool for classifying data patterns in a multi-variate feature space.

FIG. 1 shows a tool 10 for classifying data patterns in a multi-variate feature space. The data patterns received by the tool 10 are in the form of data features. As mentioned above, the data features are raw data that have been cleaned of errors not compatible with further processing or data which have been transformed to extract information from the raw data (e.g., statistical properties, transformations into a different domain, principle component analysis, etc.). An observer 12 observes the data features for changes in individual features as well as changes in the features as a whole over a predetermined time. In particular, the observer 12 determines the closeness of the feature data to any one of a plurality of known classes defined in the multi-variate feature space. If the data are close enough to any one of the known classes, then a classifier 14 classifies the feature data into one of the plurality of known classes. The data features that have been classified into one of the known classes are outputted from the tool 10 and are eventually further evaluated and analyzed.

If the data are not close enough to any one of the known classes, then a flagger 16 issues a flag. A label requester 18 requests that a user interpret the flagged data (i.e., the features) into either a new class or one of the at least one known classes, upon issuance of the flag. The user interprets the flagged data with a user input/output 20. In particular, if the interpretation is a new fault, then a new class adder 22 sets up a new cluster representative of the fault and inputs the new class to the classifier 14. Alternatively, if the interpretation is that the flagged data belongs to one of the known classes, then a class resetter 24 resets the boundaries of this class and informs the classifier 14 of the change. In addition, it is possible that the user will not make an interpretation. In this case, the data is then sent for further evaluation and analysis.

Figure 2:
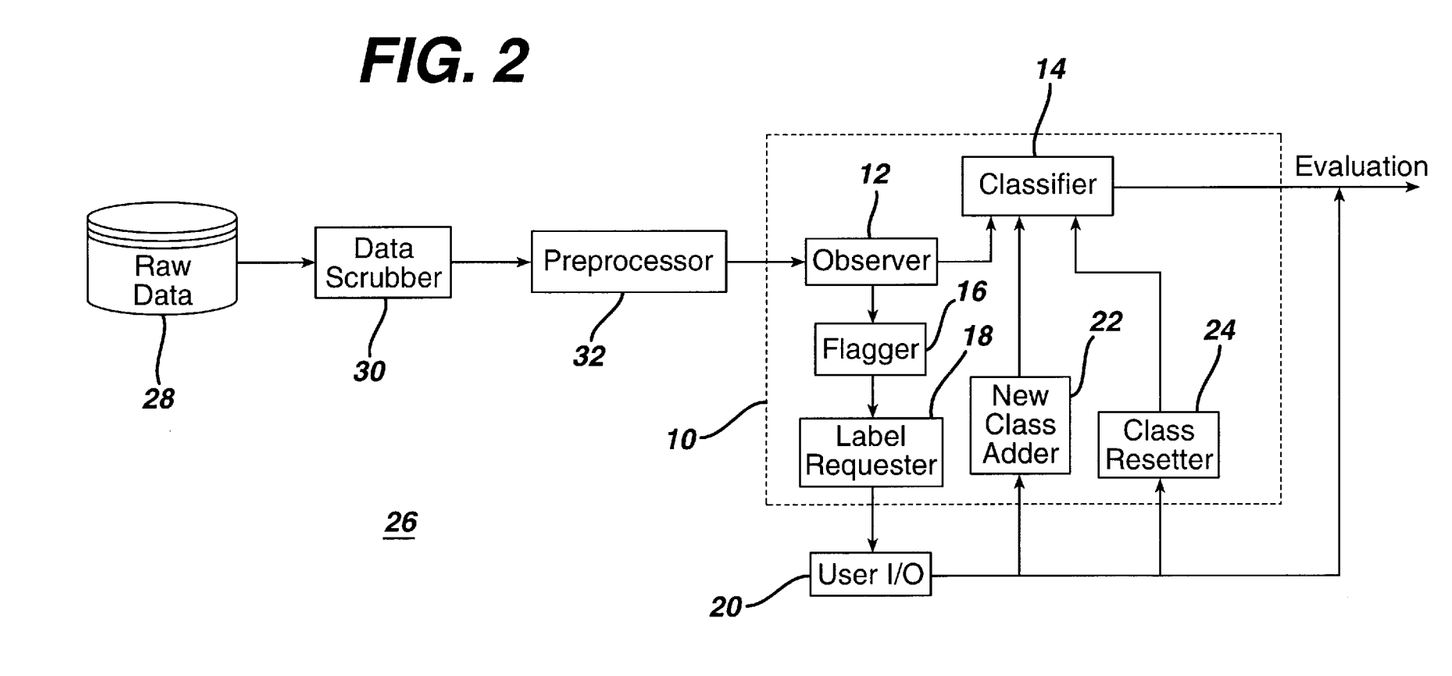
FIG. 2 shows a block diagram of the tool shown in FIG. 1 used in a system for classifying data patterns in a multi-variate feature space.

FIG. 2 shows a block diagram of the tool 10 shown in FIG. 1 used in a system 26 for classifying data patterns in a multi-variate feature space. In the system 26, a database 28 stores raw data obtained from a process that generates sensor data where it is desirable to monitor or diagnose system behavior. A data scrubber 30 scrubs the raw data received from the database 28. There can be a wide range of inaccuracies and inconsistencies such as outliers, missing data, incomplete data sets, repeated entries, old data, mislabeled data, etc., that make the data harder to analyze. The data scrubber 30 cleans up these inaccuracies and inconsistencies so that the data are better suitable for further processing. After scrubbing the data, a preprocessor 32 preprocesses the data so that the most meaningful information can be obtained for a preselected amount of variables used in the process. This results in the aforementioned feature data.

Other preprocessing functions performed by the preprocessor 32 may include normalizing the scrubbed data for each of the features. One example for normalizing includes first obtaining minimum and maximum values for normal behavior, for example during a training period, of each feature and then scaling subsequent data using these minimum and maximum values. Another example for normalizing includes taking the data and centering them around a chosen center point that can be any point in the feature space. For example, for a two-dimensional feature space, it could be the point (0,0) or point (0.5, 0.5), etc. The normalizing then uses a user-specified variance to perform the normalization for each variable according to normalizing parameters. In particular, a user specified, predetermined number of initial data readings for each variable which are validated to be "normal" (e.g., through supervision) are used to obtain the normalization parameters. All following data readings are then scaled according to the normalization parameters. While several normalization procedures can be used, the preferred one is governed by the following equation:

$$x_{normalized} = \frac{x - x_{min}}{x_{max} - x_{min}},$$

wherein
$x_{normalized}$ is the normalized variable;
x is the raw reading;
$x_{min}$ is the minimum value of normal data obtained during training or initialization; and
$x_{max}$ is the maximum value of normal data obtained during training or initialization.

Figure 3:
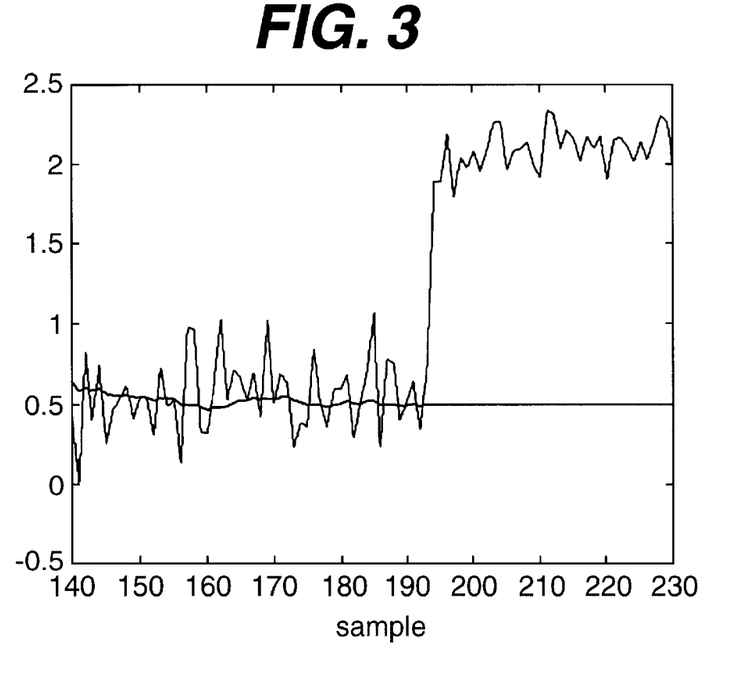
FIG. 3 shows an example of a data feature change noted by the observer shown in FIGS. 1 and 2.

As mentioned above, the observer 12 observes the data features for changes in individual features as well as changes in the features as a whole over a predetermined time. The observer 12 evaluates the closeness of any feature to the labeled prototype features by means of a distance measure (Manhattan, Gaussian, or other). If the distance is beyond a predetermined threshold, a flag is issued which gives note of such changes. One example of the predetermined threshold could be based on the amount of noise associated with normal system behavior, e.g., 3 standard deviations. However, one of ordinary skill in the art will recognize that there are a multitude of possible threshold values that could be used. FIG. 3 shows an example of a data feature change that is noted by the observer 12. In particular, FIG. 3 shows that there is an abrupt change in a data feature at around sample 190, wherein the value for the feature jumps from 0.6 to about 2.0.

Figure 4:
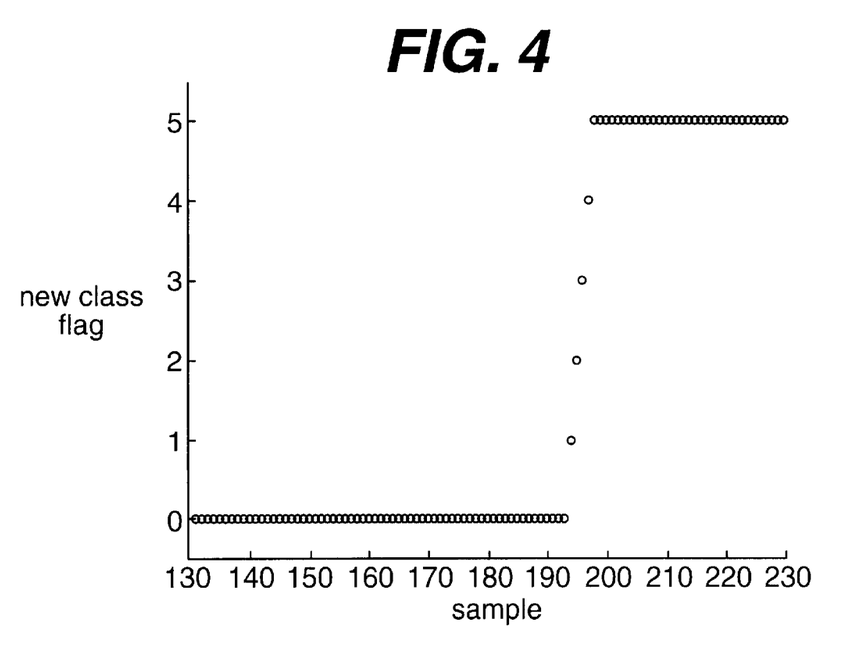
FIG. 4 shows an example of the flagger shown in FIGS. 1 and 2 issuing a flag for the scenario provided in FIG. 3.

For abrupt changes like the one shown in FIG. 3 and other changes where the features increase or decrease by a considerable amount, the flagger 16 will issue a flag. More specifically, the flag is triggered by the observer 12. Under normal operating conditions, the flag set by the flagger 16 is assigned the value 0. Once a change is detected and the data do not fall close enough to any of the known regions, the flagger 16 sets the flag value to "1". FIG. 4 shows an example of the flagger 16 issuing a flag for the scenario provided in FIG. 3.

Since the reasons for flagged data patterns are unknown, these patterns are not assigned a label. Thus, the label requester 18 requests that a user interpret the flagged data into one of the labels for any of the known classes or provide a new label for the data. The user then examines the data and determines the nature of the flagged data. If the data is of any of the known types, they are now labeled with the label of a previously known class (for example "fault_1" or more descriptively, "variable bleed valve actuator fault"). If the data is of a new type, they are labeled with this new class label (for example, "fault_23" or more descriptively "C-clip failure").

Based on the input (e.g., new label or reconfigured labels) provided by the user via the input/output 20, the new class adder 22 will set up a new cluster representative of the fault and input that information to the classifier 14. That is, if the data are of a new type, the closest unassigned prototype data points (in the case of a knn classifier) are labeled with this new class label (for example, "fault_23" or more descriptively "C-clip failure"). This way, a new class is set up.

As mentioned above, if the label of the flagged data requires that the labels of the known classes be reconfigured to accommodate this data pattern, then the class resetter 24 will reset the boundaries of one or more of the known classes and inform the classifier 14 of the change. That is, the closest unassigned prototype data in the sample space are now labeled with the label of a previously known class (for example "fault_1", or more descriptively, "variable bleed valve actuator fault").

As described above, the classifier 14 classifies the feature data in a multi-variate feature space defined for a process. The multi-variate feature space may comprise a plurality of variables depending on the process that is being monitored. As mentioned above, the classifier 14 classifies the feature data into at least one of the plurality of known classes defined in the multi-variate feature space. There are several types of classifiers that can perform this type of classification. For example, the k-means classifier or the knn classifier in either the crisp or fuzzy version are just couple of examples illustrating the possible classifiers. U.S. patent application Ser. No. 09/108,359, entitled System And Method For Generating Alerts Through Multi-Variate Data Assessment, filed Jul. 1, 1998, provides a more detailed discussion of the k-means and the knn classifier, and is incorporated herein by reference.

Figure 5A:
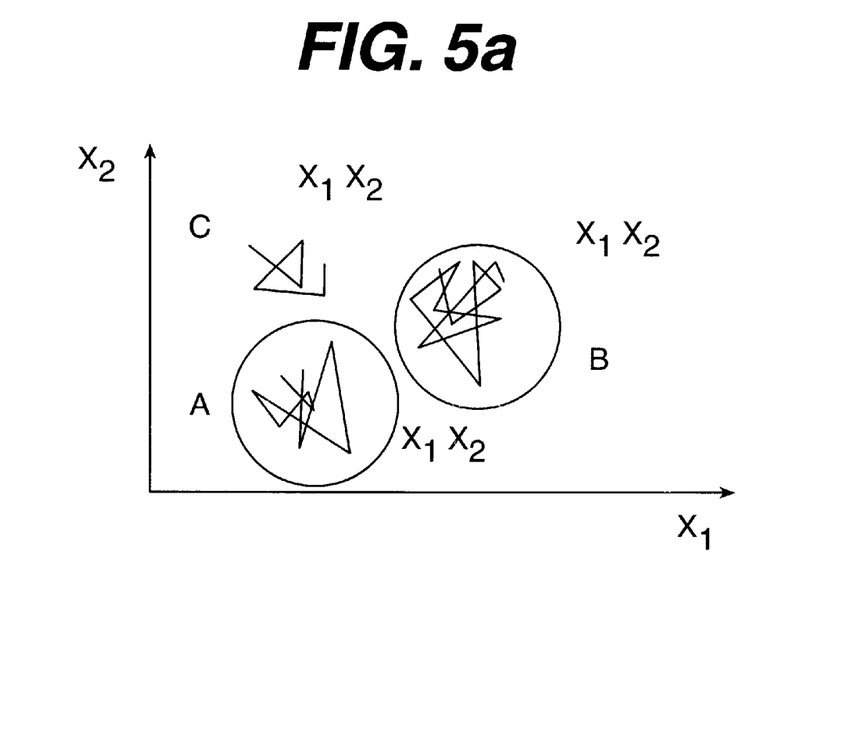
FIGS. 5a, 5b, 5c and 5d show plots of a two-dimensional classification performed by the classifier shown in FIGS. 1 and 2.
Figure 5B:
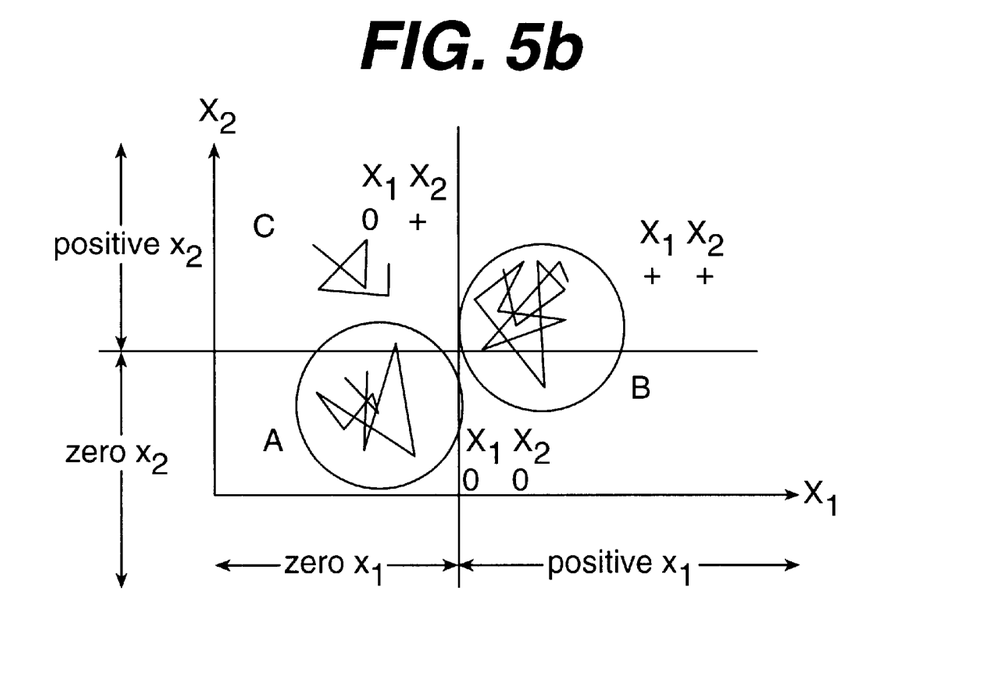

FIG. 5a shows an example of a plot of a two-dimensional classification performed by the classifier 14 shown in FIGS. 1 and 2. In this example, there are three data patterns shown (i.e., A, B, C). Data patterns A and B are classified as known data patterns, whereas data pattern C is classified as an unknown data pattern. FIG. 5b shows the plot of FIG. 5a with data thresholds illustrated. The thresholds will assist in the labeling of unknown data. Note that the thresholds do not need to be orthogonal or even described by a straight line. In these cases, the labeling is not as convenient as described herein. The thresholds used in this example divide the $x_1$-$x_2$ feature space into regions, which distinguish between data having positive values and data having values that are approximately close to zero. In FIG. 5b, the x-axis is divided into a positive $x_1$ region and a zero $x_1$ region, whereas the y-axis axis is divided into a positive $x_2$ region and a zero $x_2$ region. These thresholds are only illustrative of the concept and are not meant to limit the invention. In particular, it is possible to have additional threshold designations such as negative $x_1$ and $x_2$ and one could also divide the positive $x_1$ and $x_2$ and zero $x_1$ and $x_2$ regions into smaller regions if desired. As a result of the thresholds set forth in FIG. 5b, data pattern A has values 0, 0 for the reference coordinate $x_1$, $x_2$; data pattern B has values +, + (i.e., positive $x_1$ and positive $x_2$) for the reference coordinate $x_1$, $x_2$; and data pattern C has values 0, + for the reference coordinate $x_1$, $x_2$.

Figure 5C:
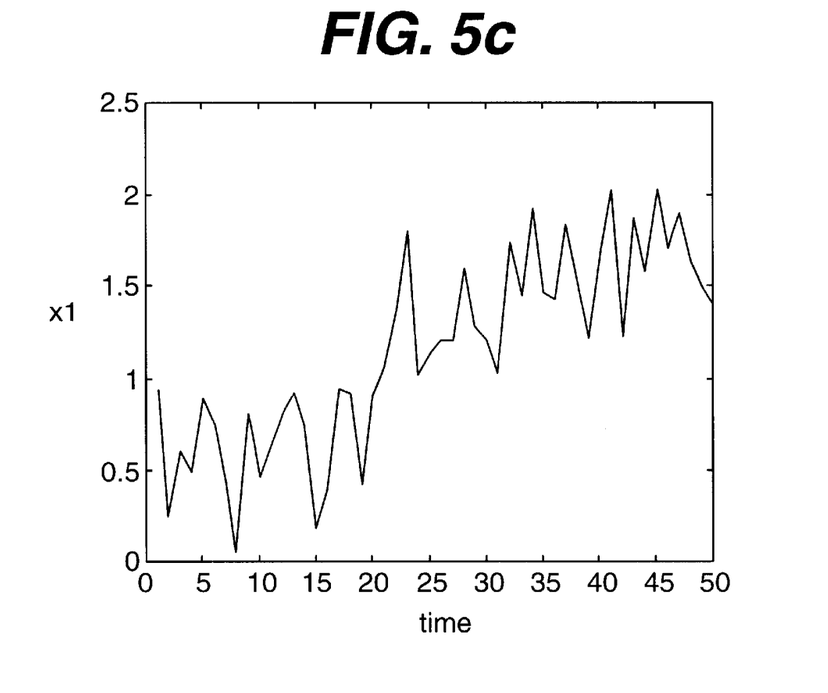
Figure 5D:
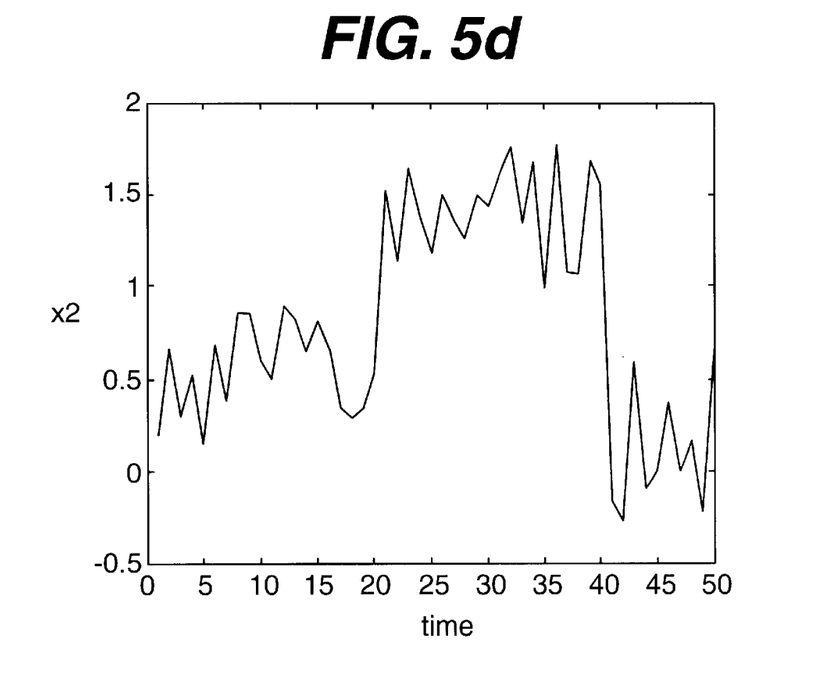

FIG. 5c and FIG. 5d show the data displayed in FIG. 5a over time. In particular, FIG. 5c shows $x_1$ over time and FIG. 5d shows $x_2$ over time. In essence, FIG. 5a is a projection of FIG. 5c and FIG. 5d where time is collapsed.

Figure 6:
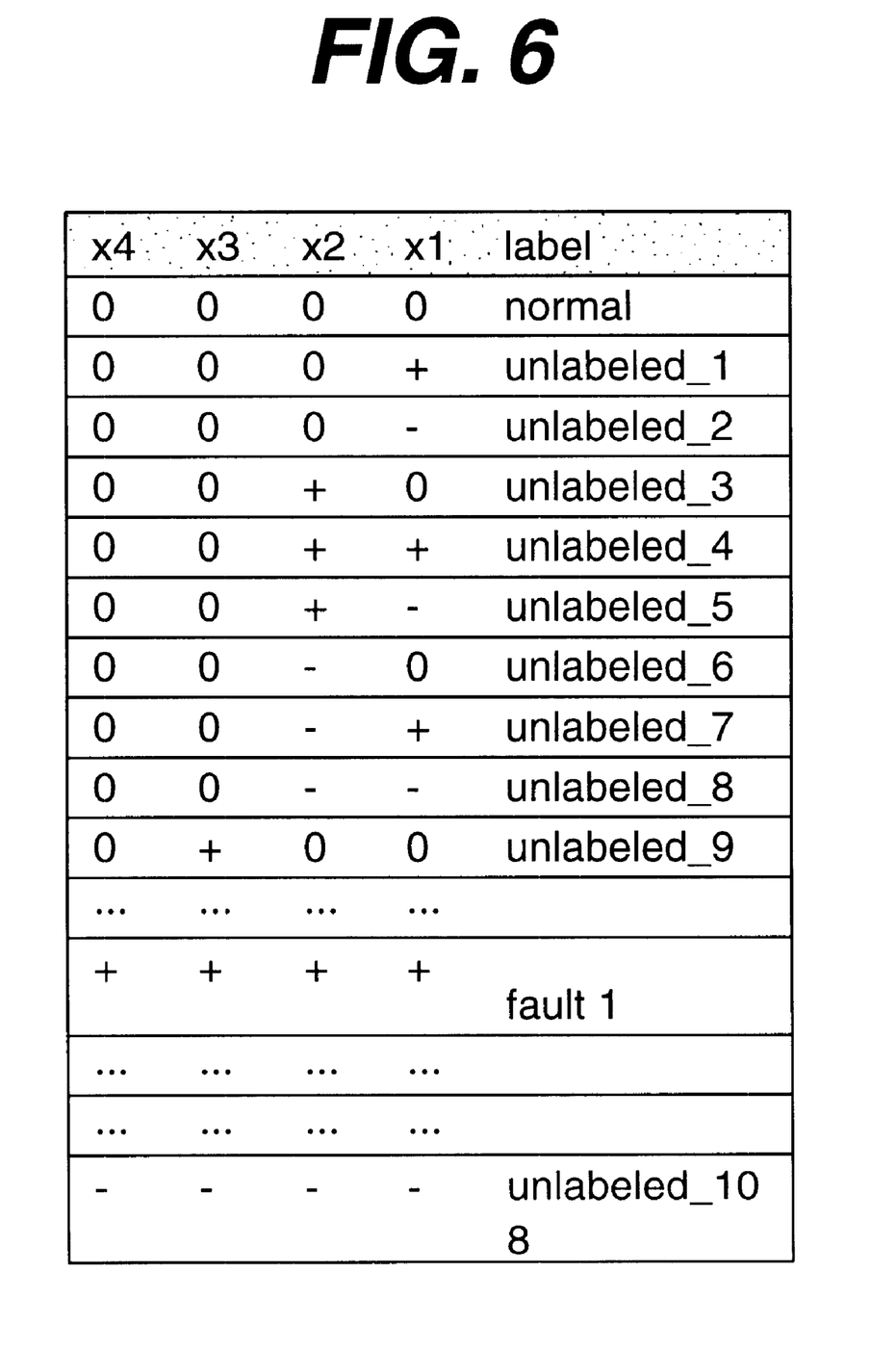
FIG. 6 shows an example of a table of features and their corresponding labels that are used by the label requester shown in FIGS. 1 and 2.

With each classified data pattern there is a corresponding label that describes the meaning of the pattern. The data patterns with known classifications have a label that describes a normal operating condition, a faulty operating condition, an alert or an incipient fault. The data patterns with unknown classifications do not have a label that describes the meaning of the patterns because it is unknown. FIG. 6 shows an example of a table of features and their corresponding labels. In FIG. 6, a data pattern that has features that classify into reference coordinates $x_1$, $X_2$, $X_3$, $X_4$ with values of 0,0,0,0 has a label that indicates normal operating conditions. A data pattern that has features that classify into reference coordinates $x_1$, $X_2$, $X_3$, $X_4$ with values of +,+,+,+ has a label that indicates a fault 1. Features shown in FIG. 6 that have an unlabeled listing (e.g., unlabeled_5) indicate that the meaning of the corresponding data pattern is unknown. Generally, the label requester 18 will request that a user interpret this pattern and provide a label that describes the data or reconfigure the boundaries of some of the other features to accommodate this pattern.

The observer 12, classifier 14, flagger 16, label requester 18, new class adder 22 and the class resetter 24 of the multi-variate data assessment tool 10 are embedded in a computer such as a workstation, however, other types of computers can be used such as a mainframe, a minicomputer, a microcomputer, a supercomputer, or a personal digital assistant. The algorithms performed in the observer 12, classifier 14, flagger 16, label requester 18, new class adder 22 and the class resetter 24 are programmed in MATLAB, but other languages such as JAVA may be used.

Figure 7A:
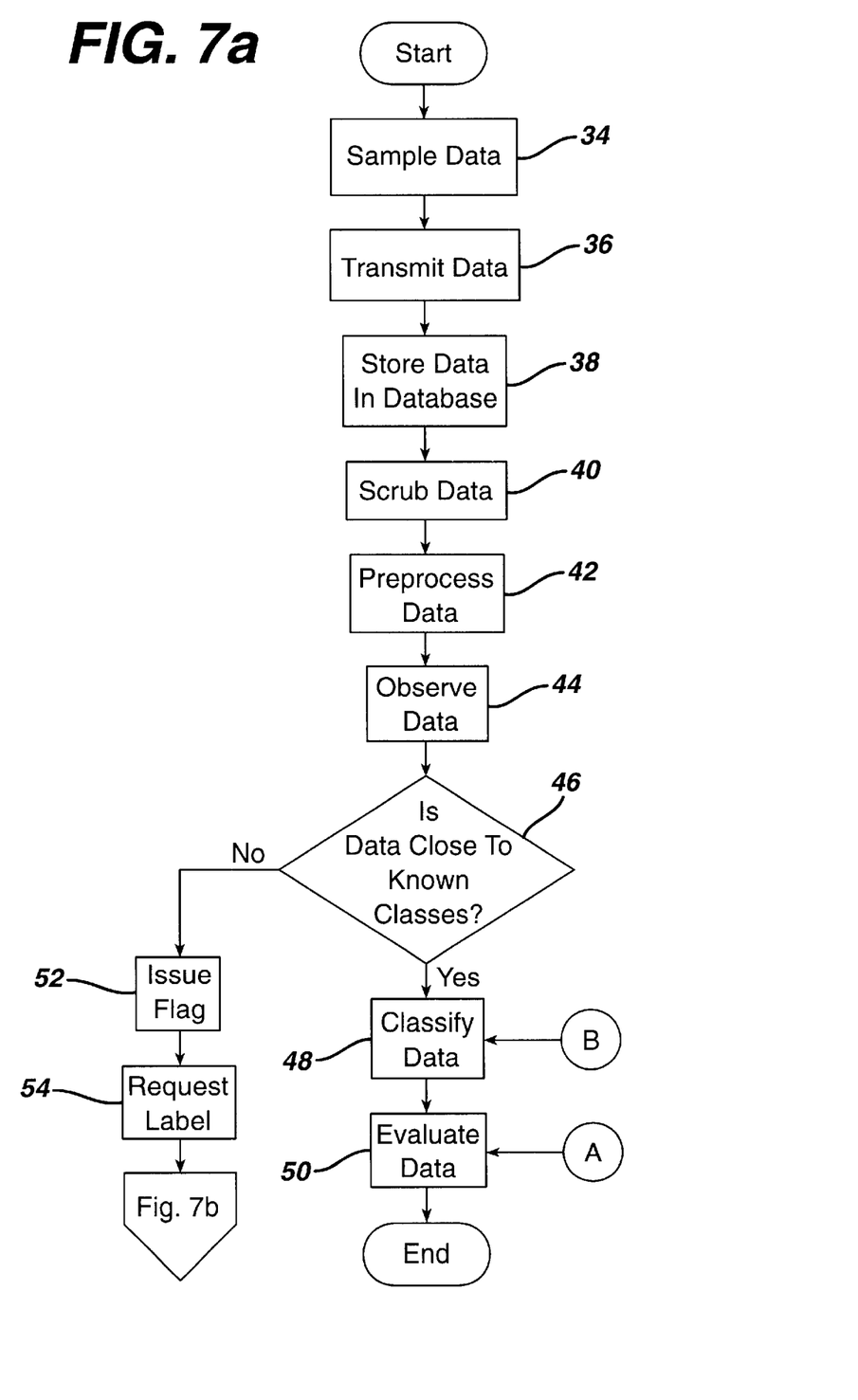
FIGS. 7a and 7b show flow charts setting forth the steps performed by the multi-variate data assessment tool shown in FIGS. 1 and 2.
Figure 7B:
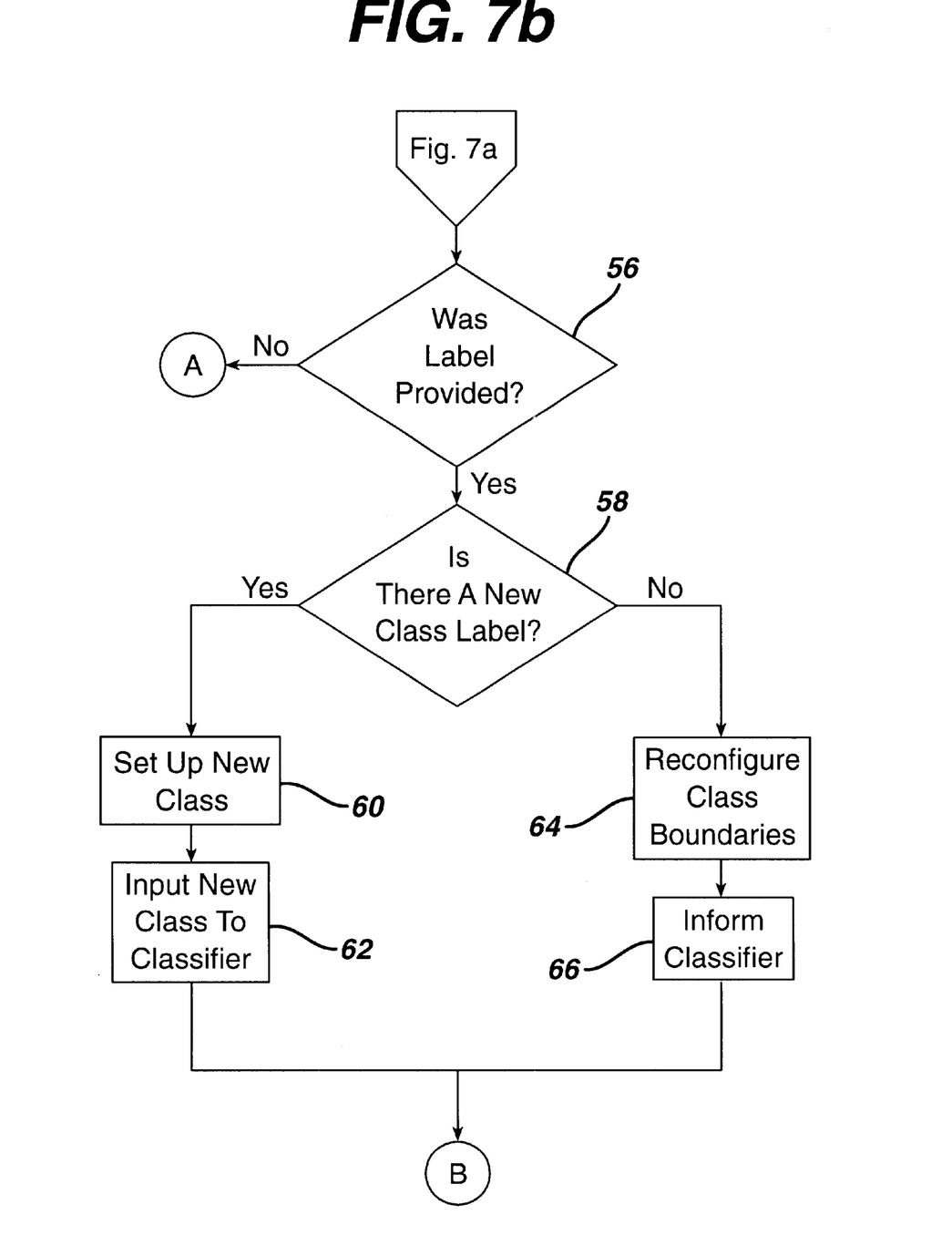

FIGS. 7a–7b show flow charts setting forth the steps performed by the multi-variate data assessment tool 10 shown in FIGS. 1 and 2. Data from a process that is being monitored and evaluated are sampled at 34. The data are transmitted to a database at 36 and stored in a database at 38. The data are scrubbed at 40 to ensure that there are no missing data entries, that the data are new, etc. After scrubbing, the data are preprocessed at 42 to extract data features and to perform normalization if desired. After preprocessing, the data are evaluated by the multi-variate assessment tool 10. In particular, the observer determines the closeness of the feature data to any one of the known classes at 44. If the data have been determined at 46 to be close enough to any one of the known classes, then the data are further classified by the classifier at 48. In particular, the classifier classifies the feature data into at least one of the known classes defined in the multi-variate feature space. Data are then outputted from the tool 10 and are eventually evaluated and analyzed at 50.

If the data are not close enough to any of the known classes as determined at 46, then a flag is issued at 52. A user is requested to interpret the flagged data into either a new class or one of the known classes at 54. If a label was not provided as determined at 56, then the data are outputted from the tool 10 and are further evaluated and analyzed at 50. If the label is a new fault as determined at 58, then a new class cluster representative of the fault is set up at 60 and inputted to the classifier at 62. Alternatively, if the label is not new and the flagged data belongs to one of the known classes, then the boundaries of this class are reconfigured at 64 and the classifier is informed of the change at 66. Eventually, all of the data are classified and sent for further evaluation and analysis.

Figure 8:
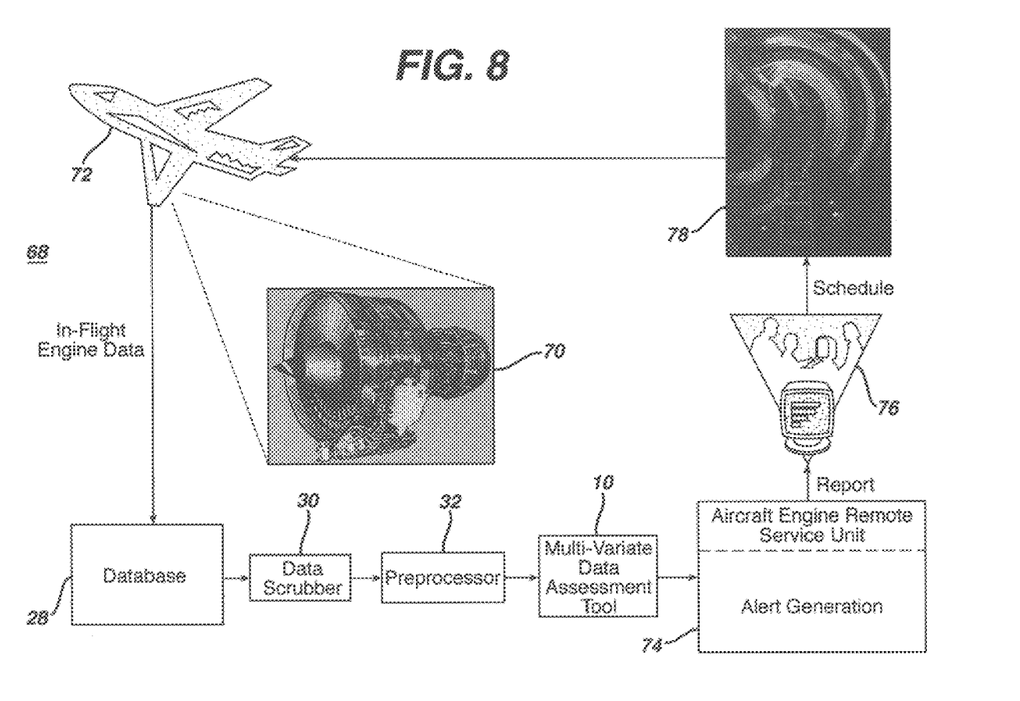
FIG. 8 shows a schematic block diagram of the system shown in FIG. 2 in use with a system for monitoring and maintaining an aircraft engine.

FIG. 8 shows a schematic block diagram of the system 26 shown in FIG. 2 in use with a system 68 for monitoring and maintaining an aircraft engine. The following embodiment is described with reference to an aircraft engine used by an aircraft such as an airplane, however, other aircraft (e.g., a helicopter) are possible. Although this invention is described with reference to an aircraft engine, the invention can be used in conjunction with any system such as a turbine, a power system, a locomotive, a chemical or mechanical process plant, or another process which generates sensor data where it is desirable to monitor or diagnose system behavior. Referring back to FIG. 8, the system 68 shows engine data being sampled from an aircraft engine 70 of an airplane 72. The engine data are sampled at different times of the flight such as during the take-off, the climb and the cruise either continuously or in snapshots. The engine data are transmitted during or after the flight to a centralized data center and stored in the database 28. The data are then collected, distributed and scrubbed by the data scrubber 30 and preprocessed by the preprocessor 32.

After preprocessing, data features are evaluated by the multi-variate assessment tool 10, which monitors a multitude of engine variables. The aircraft engine variables that are monitored are delta exhaust gas temperature (dEGT), which is the deviation from the baseline EGT, fuel flow (WF), core speed (N2), and EGT divergence, divEGT, which is the difference of the EGT between the raw EGT of the engine in question and the mean of raw EGT of all engines. These variables are illustrative of some of the aircraft engine variables that can be monitored in this embodiment and are not an exhaustive list.

As mentioned above, the multi-variate assessment tool 10 classifies the data features into a known class. The known class is indicative of a normal operating condition, a faulty operating condition, an alert or an incipient fault. The multi-variate assessment tool 10 is able to set up a new class or reconfigure the known classes to account for unknown incoming data features. An aircraft engine expert located at the remote service unit 74 monitors the assessed data and determines if the data are indicative of normal operating conditions, a failure, a fault condition, or symptoms of an incipient failure condition. The aircraft engine expert then decides whether a true alert exists and generates a report to a fleet management unit 76. If the report suggests that remedial or diagnostic actions are needed, then personnel at the fleet management unit 76 prepare a schedule of the suggested actions. Maintenance personnel 78 then perform the actions (e.g., boroscoping the engine, engine washing, overhauling the engine) as set forth in the schedule prepared by the fleet management unit 76.

In the manner described above, the preprocessor may normalize the aircraft engine variables if desired. Normalization of the engine data allows a comparison of data, which are subject to different calibration or constraints like minor design variations or material variations. In the case of the aircraft engine example, it allows comparison of different aircraft engines that are in different states of wear and that have differently tuned variables. An underlying basis of the normalization is that particular failures have directional information, which is retained over different engines and even engine families. For example, a variable bleed variable (VBV) failure results in increases of DEGT, WF, N2, and divEGT. On the other hand, a failure of a different component, e.g., a failure of a C-clip, will result in an increase of dEGT, WF, and divEGT, while N2 will drop. These characteristic changes can be seen regardless of the differences in wear or other variations mentioned above.

Figure 9A:
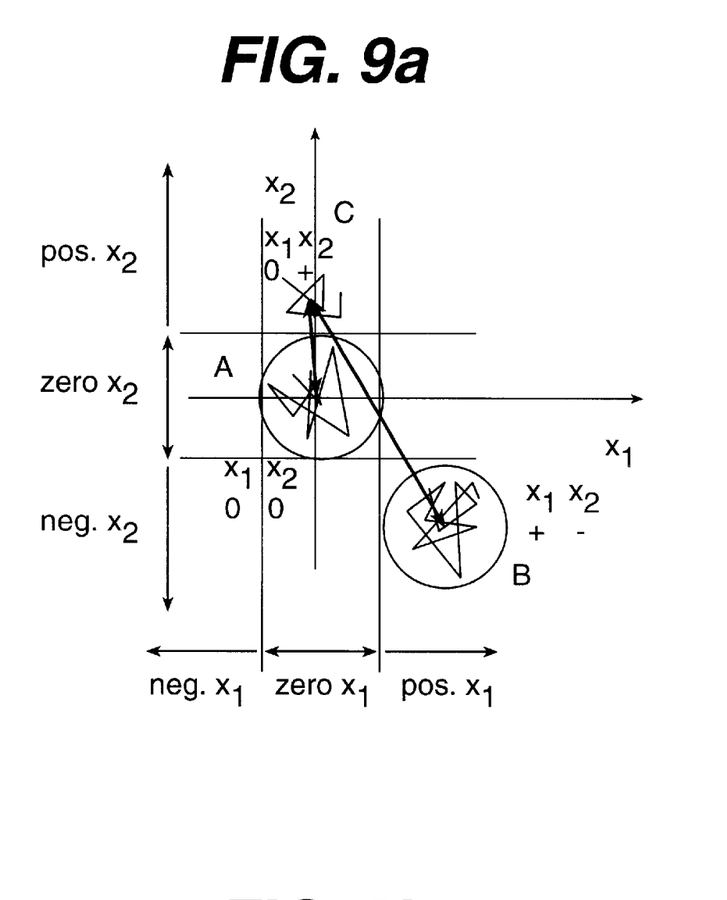
FIGS. 9a and 9b show examples of a plot of a two-dimensional classification performed by the classifier in the aircraft engine embodiment.

In this embodiment, the observer 12 determines the closeness of the feature data to a known class within a multi-variate feature space. If the data are close enough, then the classifier 14 classifies the feature data in a multi-variate feature space defined for the aircraft engine 70. Preferably, the multi-variate feature space comprises the dEGT, WF, N2, divEGT, divWF and divN2. As mentioned above, the classifier 14 classifies the feature data into at least one of the plurality of known classes defined in the multi-variate feature space. FIG. 9a shows an example of a plot of a two-dimensional evaluation and classification performed by the observer 12 and classifier 14 shown in FIGS. 1 and 2 for this embodiment. In this example, there are three data patterns shown (i.e., A, B, C). Data patterns A and B are classified as known data patterns, whereas data pattern C is classified as an unknown data pattern. FIG. 9a also shows the data thresholds. In this example, the x-axis is divided into a negative $x_1$ region, a zero $x_1$ region and a positive $x_1$ region, whereas the y-axis axis is divided into a negative $x_2$ region, a zero $x_2$ region and a positive $x_2$ region. These thresholds are only illustrative of the concept and are not meant to limit this embodiment. In FIG. 9a, data pattern A has values 0, 0 for the reference coordinate $x_1$, $x_2$; data pattern B has values +, − (i.e., positive $x_1$ and negative $x_2$) for the reference coordinate $x_1$, $x_2$; and data pattern C has values 0, + for the reference coordinate $x_1$, $x_2$.

Figure 9B:
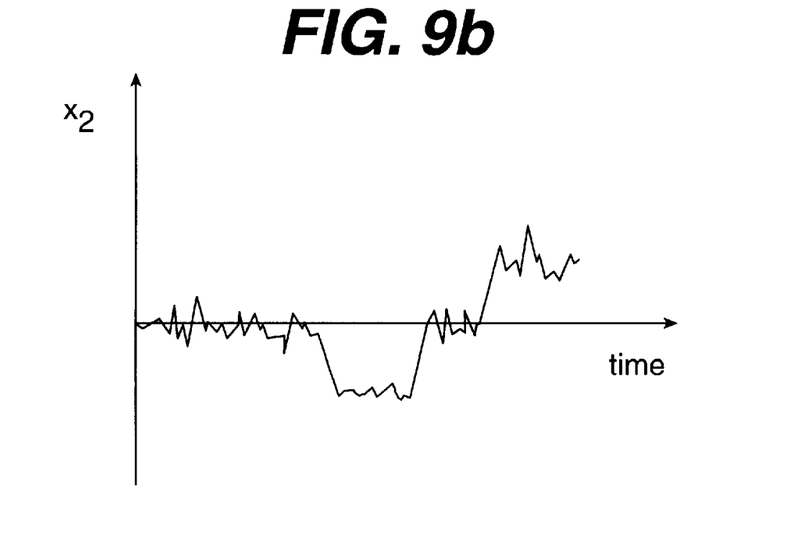

FIG. 9b shows a plot of the data patterns shown in FIG. 9a relative to the $x_2$ axis over a specified time period. FIG. 9b indicates how features of $x_2$ take on values around zero in the first third, then drop into the negative range in the second third, and finally rise to the higher positive range in the last third. These three periods coincide with presence in classes A, B, C, respectively, over time.

Figure 10:
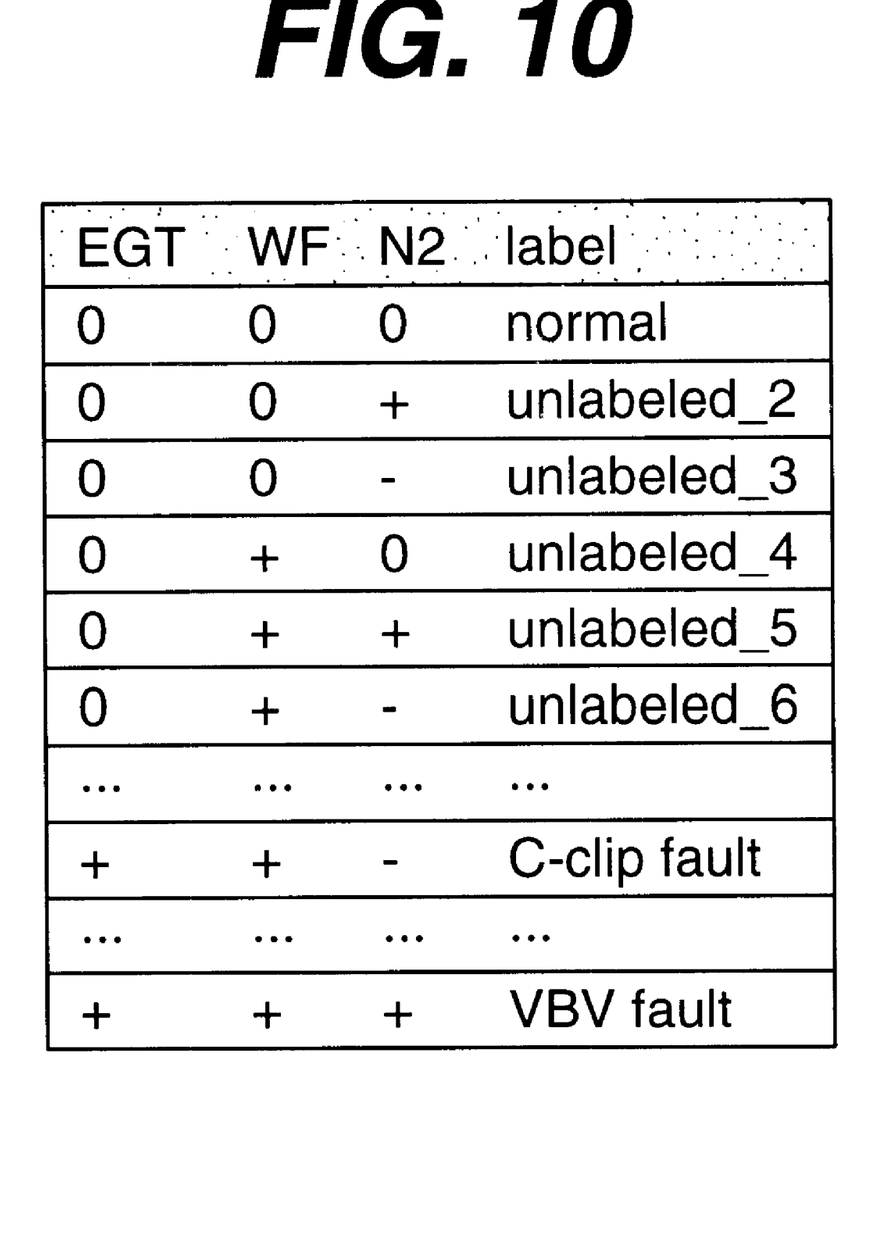
FIG. 10 shows an example of a table of features and their corresponding labels for the aircraft engine embodiment.

FIG. 10 shows an example of a table of features and their corresponding labels for an aircraft engine embodiment. In FIG. 10, a data pattern that has features that classify into reference variables EGT, WF, N2 with values of 0,0,0 has a label that indicates normal operating conditions. A data pattern that has features that classify into reference variables EGT, WF, N2 with values of 0,+,+ have an unlabeled listing (e.g., unlabeled_5), which means that the corresponding data pattern is unknown.

As in the embodiment described for FIGS. 1 and 2, the flagger 16 for the aircraft engine embodiment will issue a flag if the distance from the features to any of the known classes is too large (typically after an increase or decrease in the features over the predetermined time period). The label requester 18 then requests that a user interpret the flagged data (i.e., the features) into either a new class or one of the known classes, upon issuance of the flag. The user interprets the flagged data with the user input/output 20. If the interpretation is a new fault, then the new class adder 22 sets up a new cluster representative of the fault and inputs the new class to the classifier 14. Alternatively, if the interpretation is that the flagged data belongs to one of the known classes, then the class resetter 24 resets the boundaries of this class and informs the classifier 14 of the change. In addition, it is possible that the user will not make an interpretation. In this case, the data are then outputted from the tool 10 for further evaluation and analysis.

After the tool is finished assessing the data, then the aircraft engine expert located at the remote service unit 74 monitors the assessed data and determines if the data are indicative of a failure, a fault condition, symptoms of an incipient failure condition or normal behavior. As described in FIG. 8, the aircraft engine expert then decides whether a true alert condition exists and generates a report to a fleet management unit 76. If the report suggests that remedial or diagnostic actions are needed, then personnel at the fleet management unit 76 prepare a schedule of the suggested actions. Maintenance personnel 78 then perform the actions (e.g., boroscoping the engine, engine washing, overhauling the engine) as set forth in the schedule prepared by the fleet management unit 76.

Figure 11:
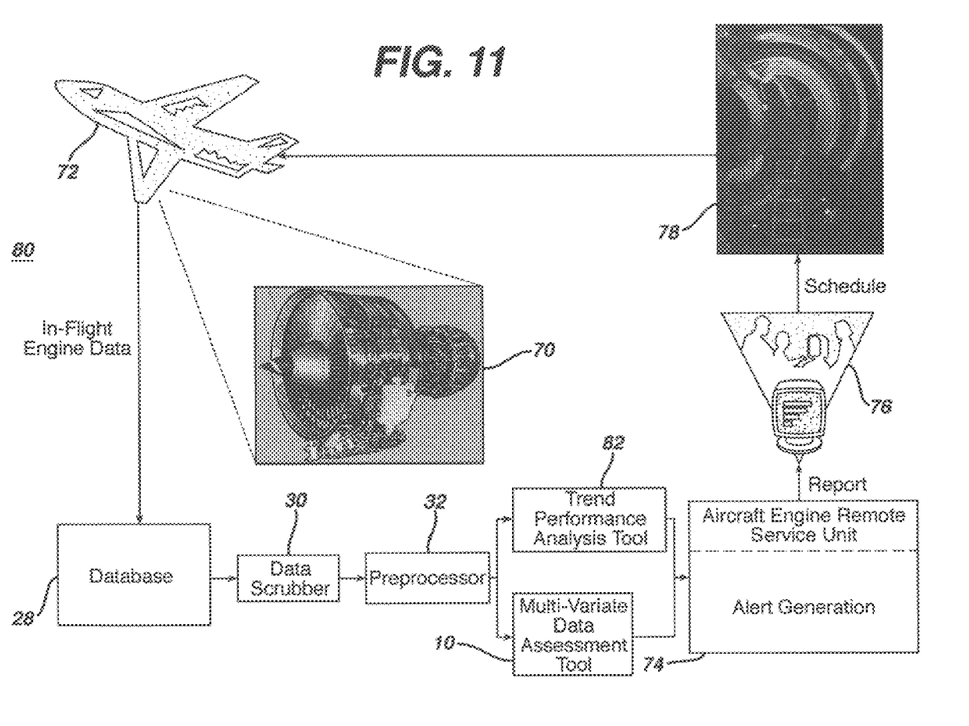
FIG. 11 shows an alternative embodiment to the one shown in FIG. 8, wherein the multi-variate data assessment tool is used in conjunction with a trend performance analysis tool to validate alerts generated therefrom.

In an alternative embodiment, FIG. 11 shows the multi-variate data assessment tool 10 used in conjunction with a trend performance analysis tool to validate alerts generated therefrom. A trend performance analysis tool is used to monitor a multitude of variables in a technical process. Again for illustration purposes, this alternative embodiment is described with reference to an aircraft engine process, and as mentioned earlier, the following can be used with any system or process, which generates sensor data, where it is desirable to monitor or diagnose system behavior. FIG. 11 shows a block diagram of a system 80 for monitoring and maintaining an aircraft engine 70. In this embodiment, the multi-variate data assessment tool 10 works in parallel with a trend performance analysis tool 82, however, both may be integrated into the same tool. As in the embodiment set forth in FIG. 2, the multi-variate assessment tool 10 classifies the data features into a known class, even if it is initially determined by the observer to be not close to a known class. That way the alerts generated from the trend performance analysis tool 82 can be validated against the data classification made by the multi-variate assessment tool 10. Using this information, the aircraft engine expert located at the remote service unit 74 is able to determine if the data are indicative of a failure, a fault condition, symptoms of an incipient failure condition or normal behavior.

Figure 12:
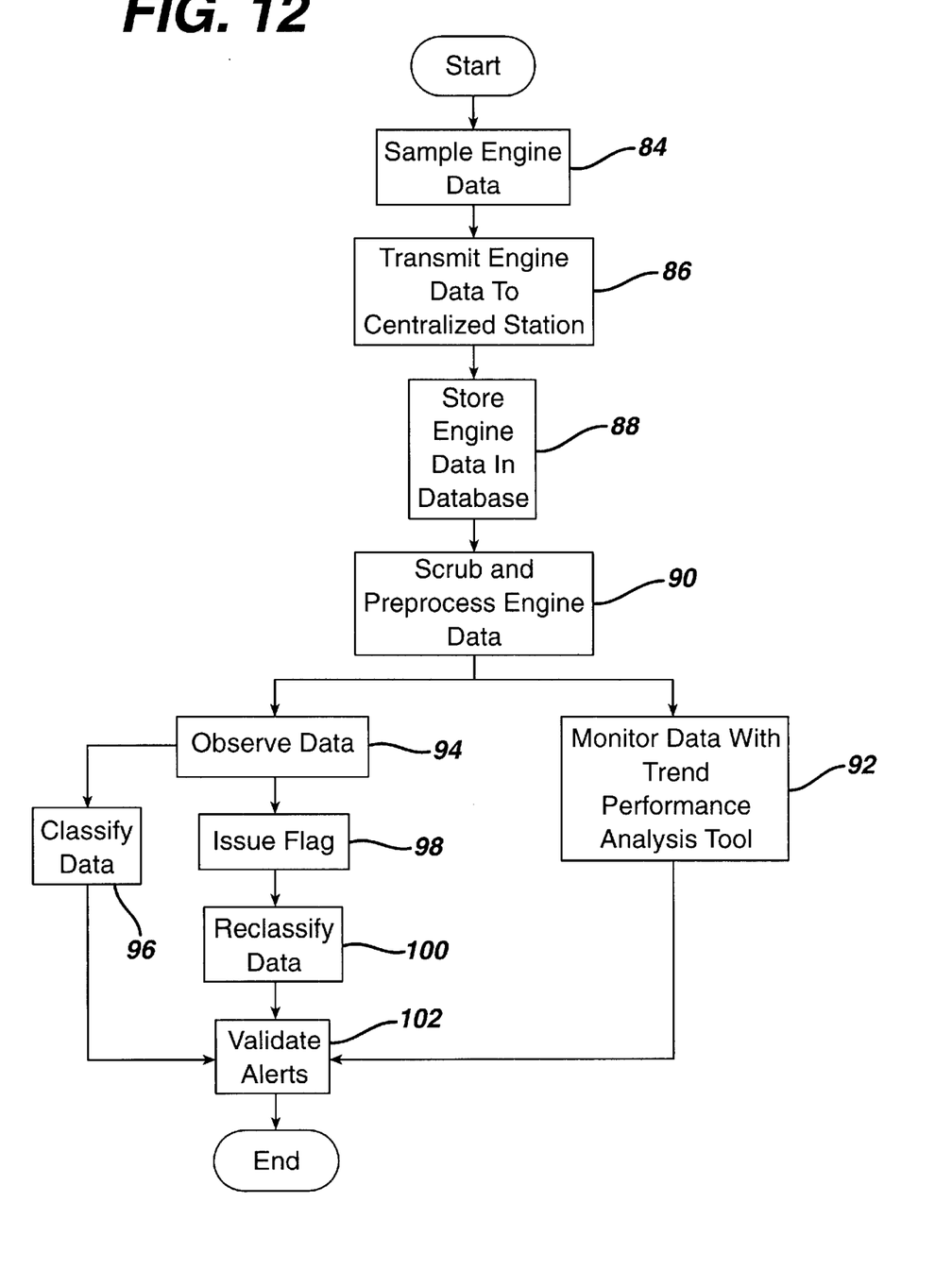
FIG. 12 shows a flow chart setting forth the steps performed by the system shown in FIG. 11.

FIG. 12 shows a flow chart setting forth the steps performed by the aircraft engine monitoring system 80 shown in FIG. 11. Engine data are sampled from the aircraft engine at 84 at different times of the flight such as during take-off, climb and cruise. The engine data are transmitted to a centralized data center system at 86 and stored in a database at 88. At 90, the data are scrubbed to ensure that there are no missing data entries for any particular variable and preprocessed to extract data features. After scrubbing and preprocessing, the data are evaluated by the trend performance analysis tool at 92 where the data for each variable are compared against trending baseline data. If the data for a particular engine variable exceed a predetermined threshold limit, then the trend performance analysis tool issues an alert.

At the same time the engine data are being evaluated by the trend performance analysis tool, the data are simultaneously evaluated by the multi-variate variate assessment tool. In particular, the observer determines the closeness of the feature data to any one of the known classes at 94. If the data are close enough to any one of the known classes, then the data are further classified by the classifier at 96. In particular, the classifier classifies the feature data into at least one of the known classes. If the data are not close enough to any of the known classes, then a flag issues at 98. A user is then requested to interpret the flagged data into either a new class or one of the known classes. If the interpretation is a new fault, then a new class cluster representative of the fault is set up and inputted to the classifier. Alternatively, if the label is not new and the flagged data belongs to one of the known classes, then the boundaries of this class are reconfigured and the classifier is informed of the change. Eventually, the data is reclassified again at 100. Afterwards, alerts generated by the trend performance tool are validated against the classification made by the multi-variate assessment tool at 102 by cross-referencing the results. If both tools indicate an alert condition, then the alert is considered to be validated; otherwise it is not.

It is therefore apparent that there has been provided in accordance with the present invention, a system and method that classifies unknown data patterns in a multi-variate feature space. The invention has been described with reference to several embodiments, however, it will be appreciated that variations and modifications can be effected by a person of ordinary skill in the art without departing from the scope of the invention.

What is claimed is:

1. A system 26 for classifying data obtained from a process in a multi-variate feature space, comprising:
    an observer 12 that evaluates the closeness of the data to any one of a plurality of known classes defined in the multi-variate feature space;
    a classifier 14 for classifying the evaluated data into one of the plurality of known classes;
    a flagger 16 for flagging data having an unknown classification;
    a label requester 18 for requesting that the flagged data be interpreted into either a new class or one of the plurality of known classes; and
    a classifier adjuster 22 or 24 that adjusts the classifier according to the interpretation.

2. The system 26 according to claim 1, further comprising a data scrubber 30 that scrubs the data.

3. The system 26 according to claim 1, further comprising a preprocessor 32 that extracts features from the data.

4. The system 26 according to claim 3, further comprising a normalizer that normalizes the data.

5. The system 26 according to claim 3, wherein the observer 12 evaluates the closeness of the features to the plurality of known classes.

6. The system 26 according to claim 5, wherein said flagger 16 issues a flag for features that are sufficiently far enough away from the plurality of known classes.

7. The system 26 according to claim 1, wherein said label requester 18 requests that a user interpret the flagged data into either a new class or one of the plurality of known classes.

8. The system 26 according to claim 1, wherein said classifier adjuster 22 or 24 comprises a new class adder 22 that adds a data cluster representative of the new class into said classifier 14.

9. The system 26 according to claim 1, wherein said classifier adjuster 22 or 24 comprises a class resetter 24 that resets the plurality of known classes in said classifier 14 to accommodate new class boundaries.

10. A method for classifying data obtained from a process in a multi-variate feature space, comprising:
    observing the closeness of the data to any one of a plurality of known classes defined in the multi-variate feature space;
    classifying the observed data into one of the plurality of known classes;
    flagging data having an unknown classification;
    requesting that the flagged data be interpreted into either a new class or one of the plurality of known classes;
    adjusting the classes in the multi-variate feature space according to the interpretation; and
    reclassifying the data according to the adjustment.

11. The method according to claim 10, further comprising scrubbing the data.

12. The method according to claim 10, further comprising extracting features from the data.

13. The method according to claim 12, further comprising normalizing the data.

14. The method according to claim 12, wherein the observing observes the closeness of the features to the plurality of known classes.

15. The method according to claim 14, wherein said flagging issues a flag for features that are sufficiently far enough away from the plurality of known classes.

16. The method according to claim 10, wherein said requesting requests that a user interpret the flagged data into either a new class or one of the at least one known classes.

17. The method according to claim 10, wherein said adjusting comprises adding a data cluster representative of a new class.

18. The method according to claim 10, wherein said adjusting comprises resetting the plurality of known classes to accommodate new class boundaries.

19. A multi-variate data assessment tool 10 for assessing data obtained from a process, comprising:
    an observer 12 that evaluates the closeness of the data to any one of a plurality of known classes defined in a multi-variate feature space for the process;
    a classifier 14 that classifies the evaluated data into one of the plurality of known classes;
    a flagger 16 for flagging data having an unknown classification;
    a label requester 18 for requesting that the flagged data be interpreted into either a new class or one of the plurality of known classes;
    a new class adder 22 that adds a data cluster representative of a new class into said classifier; and
    a class resetter 24 that resets the plurality of known classes in said classifier 14 to accommodate new class boundaries.

20. The tool 10 according to claim 19, wherein said flagger 16 issues a flag for data that are sufficiently far enough away from the plurality of known classes.

21. The tool 10 according to claim 19, wherein said label requester requests that a user interpret the flagged data into either a new class or one of the plurality of known classes.

22. A method for assessing data obtained from a process in a multi-variate feature space, comprising:
    extracting a plurality of features from the data;
    observing the closeness of each of the plurality of features to any one of a plurality of known classes defined in the multi-variate feature space;

classifying the observed feature data into one of the plurality of known classes;

flagging data having an unknown classification;

requesting that the flagged data be interpreted into either a new class or one of the plurality of known classes;

adjusting the plurality of known classes to accommodate the interpretation; and reevaluating the data in accordance with the adjusted classes in the multi-variate feature space.

23. The method according to claim 22, further comprising scrubbing the data.

24. The method according to claim 22, further comprising normalizing the data.

25. The method according to claim 22, wherein said flagging issues a flag for the plurality of features that are sufficiently far enough away from the plurality of known classes.

26. The method according to claim 22, wherein said requesting requests that a user interpret the flagged data into either a new class or one of the plurality of known classes.

27. The method according to claim 22, wherein said adjusting comprises adding a data cluster representative of a new class.

28. The method according to claim 22, wherein said adjusting comprises resetting the plurality of known classes to accommodate new class boundaries.

29. The method according to claim 22, further comprising using a trend performance analysis tool to assess the data.

30. The method according to claim 29, further comprising validating the reevaluated data with the trend performance analysis tool.

* * * * *